United States Patent

Sandler

[15] 3,679,700

[45] July 25, 1972

[54] PREPARATION OF N-VINYL CARBAZOLE

[72] Inventor: Stanley Robert Sandler, Springfield, Pa.
[73] Assignee: Borden Inc., New York, N.Y.
[22] Filed: May 13, 1970
[21] Appl. No.: 37,063

[52] U.S. Cl. ............................................................260/315
[51] Int. Cl. ......................................................C07d 27/68
[58] Field of Search....................................................260/315

[56] References Cited

UNITED STATES PATENTS

| | | | |
|---|---|---|---|
| 2,066,160 | 12/1936 | Reppe et al.............................. | 260/315 |
| 2,153,993 | 4/1939 | Reppe et al.............................. | 260/315 |

FOREIGN PATENTS OR APPLICATIONS

| | | | |
|---|---|---|---|
| 940,981 | 3/1956 | Germany................................ | 260/315 |

OTHER PUBLICATIONS

Advances in Organic Chemistry, Vol. 5:3 (1965) Parker Interscience Publishers

Primary Examiner—Henry R. Jiles
Assistant Examiner—S. D. Winters
Attorney—George P. Maskas, Edward L. Mandell and George A. Kap

[57] ABSTRACT

A method for preparing an intermediate hydrolyzable to N-vinyl carbazole comprises passing acetylene into a substantially anhydrous liquid mixture of an alkali-metal carbazole in an inert reaction medium selected from the group consisting of N-methyl-2-pyrrolidone, N,N-dimethylacetamide and dimethyl sulfoxide, said mixture containing at least 10 percent by weight of said metal carbazole. The new method is operable at atmospheric pressure, thus avoiding the hazards entailed in high-pressure acetylene systems.

12 Claims, No Drawings

PREPARATION OF N-VINYL CARBAZOLE

BACKGROUND OF THE INVENTION

N-vinyl carbazole is useful commercially as a monomer for producing polyvinyl carbazole polymers and also as an intermediate in a variety of synthetic reactions, particularly in the development of dyeability properties in difficultly dyeable fibers and films such as those made from polypropylene. The means available heretofore for the manufacture of N-vinyl carbazole have all involved reactions of acetylene at high pressure. These methods have obvious disadvantages in that they are subject to the inherent danger of explosion.

Such previously disclosed methods include vinylation of carbazole at 15–20 atmospheres in the presence of potassium hydroxide and N-methyl-2-pyrrolidone (German Pat. No. 940,981 issued Mar. 29, 1956) and a high-pressure vinylation of carbazole in the presence of zinc oxide and a catalytic amount of anhydrous potassium carbazole in white spirits H.W. Davidge, J. Appln. Chem 9, 241 (1959).). When the present inventor carried out these procedures at atmospheric pressure both procedures failed to yield any appreciable quantity of N-vinyl-carbazole.

SUMMARY OF THE INVENTION

A method has now been found whereby N-vinyl-carbazole can be conveniently prepared at low pressures, for example atmospheric pressure, without the hazards entailed in the use of high-pressure systems. Briefly stated, the present invention comprises the steps of (a) passing acetylene into a substantially anhydrous liquid mixture of an alkali-metal carbazole in an inert reaction medium selected from the group consisting of N-methyl-2-pyrrolidone, N,N-dimethylacetamide and dimethyl sulfoxide, to form an intermediate, said mixture containing at least 10 percent by weight of said metal carbazole, and (b) hydrolyzing said intermediate by admixture with water or a weak acid.

DETAILED DESCRIPTION

The solvents which have been found uniquely appropriate as the reaction or acetylenating medium of this invention, and which can be used singly or in combination, are N-methyl-2-pyrrolidone, N,N-dimethylacetamide and dimethyl sulfoxide. It is not completely understood why these particular solvents have this unique property. While they are all good solvents for both carbazole and acetylene, there are other such good solvents which are not effective as the medium for the reactions of this invention.

The pressure imposed on the reaction mixture of this invention can vary over a wide range. Indeed, pressures can be used as high as those employed in the prior art of acetylenating carbazole, such as 10 to 20 atmospheres. However, a distinct advantage of the present method is that lower pressures as up to about 5 atmospheres can be used. Lower than atmospheric pressures, as for example pressures equal to half an atmosphere can also be used. For example, the acetylene can be diluted with an inert gas, and introduced into the reaction mixture at partial pressures less than atmospheric pressure. Preferably, the reaction is carried out with undiluted acetylene and with the reaction mixture under substantially atmospheric pressure.

The alkali-metal carbazole in this invention can be prepared directly in the reaction medium of this invention by reacting carbazole therein with a stoichiometrically equivalent amount of an alkali-metal hydride such as sodium hydride or of an alkali-metal alkyl such as methyl lithium, methyl sodium or butyl lithium.

Alternatively, the dry metal salt of carbazole can be prepared by other known methods using a solvent other than the acetylenating medium and then transferred into the acetylenating medium by extraction or by other steps of separation and transfer. Illustratively, lithium methyl can be dissolved in anhydrous ethyl ether and added dropwise to an anhydrous solution of carbazole in tetrahydrofuran. Or anhydrous carbazole can be added dropwise to a solution of sodium hydride in tetrahydrofuran. In either of these cases the resulting anhydrous solution of alkali-metal carbazole can subsequently be (1) freed of solvent by distillation under reduced pressure and (2) dissolved in the inert acetylenation medium for reaction with acetylene therein. Steps (1) and (2) can be carried out in sequence, or they can take place simultaneously as illustrated in Example 7 below.

Still another method for preparing the dry metal salt is carried out by suspending equivalent amounts of carbazole and an alkali-metal hydroxide selected from the group consisting of potassium hydroxide, cesium hydroxide and rubidium hydroxide in a dry hydrocarbon solvent such as xylene, removing the water of neutralization by azeotropic distillation and then removing the hydrocarbon solvent by distillation under reduced pressure.

The dry alkali-metal carbazole can be stored under nitrogen in a desiccator until used for the purposes of this invention, or it can be placed in the anhydrous acetylenation medium as soon as prepared.

In carrying out the method of this invention, a necessary condition is that the acetylenation medium must be substantially anhydrous. Thus, if the alkali-metal carbazole is prepared by neutralization of carbazole with an alkali-metal hydroxide, the water of neutralization must not be carried over to the acetylenation medium. At least this water must be absent when acetylene is introduced into the acetylenation medium. Otherwise, acetylene will not react at substantially atmospheric pressure to form vinyl carbazole or its intermediate.

Furthermore, in the interest of high yield, a major portion and preferably substantially all of the carbazole moiety should be present in the form of the anhydrous alkali-metal salt when acetylene is introduced.

The concentration of the metal carbazole in the reaction medium can vary over a wide range. At higher concentrations the mixture becomes too viscous for proper mixing and solution of acetylene to effect reaction. At lower concentrations, reaction is too slow to be practical. Generally, the inventor likes to use concentrations from about 10 to 50 percent. Preferably the concentration should be between about 20 percent and 35 percent.

Acetylene can be introduced into the reaction medium by any of the known means of introducing gases into a liquid such as shaking and bubbling. The preferred method is to bubble the acetylene through a sintered glass nozzle, the rate of bubbling being selected to balance economic factors. Slow addition of acetylene minimizes the requirements for recovery of unused acetylene while fast addition minimizes the time required for use of the reactor equipment. Therefore, while the reaction can be carried out over a period between about 1 and 24 hours, it is preferred to operate within about 3 to 5 hours.

The reaction of this invention can be carried out while maintaining the temperature of the reaction medium over a wide range such as between about 130° C. and 210° C. However, for best results it is preferred to react the carbazole salts of sodium, potassium, cesium and rubidium with acetylene at between about 140° C. and 180° C., more particularly between about 145° C. and 160° C. whereas for the acetylenation of lithium carbazole a temperature between about 190° C. and 210° C. is preferred.

The reaction of acetylene with the anhydrous metal salt of carbazole forms an intermediate which can be hydrolyzed to vinyl carbazole by the addition of water. The inventor believes that said intermediate is the corresponding anhydrous metal salt of vinyl carbazole and that the water provides a proton to replace the metal ion of the salt.

Said proton can also be provided by other acids besides water so that hydrolysis in its broadest sense as used herein includes reaction not only with water but with other protonating agents, i.e., acids. However, acids which are stronger than water must be used with special precautions requiring high dilution and slow rate of addition in order to avoid acid-catalyzed polymerization of vinyl carbazole. The preferred hydrolytic or protonating agent is water itself, which can be used either in stoichiometric amount or in excess.

When water is used in amount substantially just sufficient to hydrolyze all the intermediate, the reaction medium can then be distilled off, leaving a crude residue from which N-vinyl carbazole can be crystallized. When an excess of water is used, an amount may be added to the intermediate mixture sufficient to cause precipitation of an oil from which vinyl carbazole can then be obtained by steps of extraction, drying and crystallization. Various other methods of handling the hydrolyzed product to obtain vinyl carbazole therefrom will occur to those trained in the art of chemical synthesis.

The invention will be further described in connection with the following examples which are set forth for the purpose of illustration only. In these examples and elsewhere herein proportions are in parts by weight unless specifically stated to the contrary.

EXAMPLE 1

To a 500 ml. round bottom three-necked flask equipped with a stirrer, a reflux condenser and a Dean-Stark trap there was added 40.1 g. (0.24 mole) carbazole, 15.3 g. (0.24 mole (85%) KOH) potassium hydroxide powder and 200 ml. of dry xylene. The solution was refluxed for 5 hours to remove the water and the xylene was removed under reduced pressure to obtain a substantially anhydrous residue containing potassium carbazole.

There was then added to this residue 200 ml. of N-methyl-2-pyrrolidone to form a reaction mixture. A gas-addition tube reaching below the surface of the liquid was connected with a source of acetylene. The contents of the flask were heated to 180° C. and acetylene was passed into the reaction mixture while said mixture was kept at atmospheric pressure. The rate of introducing acetylene was 36 ml./minute for 5 hours (0.48 mole). The reaction mixture containing intermediate was cooled to room temperature. Water was added in excess yielding a dark oily black solid which weighed after filtering, washing, and drying, 58.9 g. Recrystallization from absolute ethanol yielded N-vinyl carbazole.

EXAMPLE 2

The procedure of Example 1 was followed using all the same amounts and conditions excepting that the N-methyl-2-pyrrolidone was replaced by an equal volume of N,N-dimethylacetamide. After passing 0.50 mole acetylene into the medium to form the intermediate and then cooling to room temperature, 4.5 g (0.25 mole) of water was added. The dimethyl acetamide was recovered by distilling under vacuum. Further distillation (0.07 mm. Hg.) yielded 67 percent of the theoretical amount of N-vinyl carbazole.

EXAMPLE 3

Sodium carbazole (0.328 moles) was formed in situ in 250 ml. of N,N-dimethylacetamide by reacting the theoretical amounts of carbazole and sodium hydride. At a temperature maintained between 150° and 160° C., 0.419 moles of acetylene were passed into this solution maintained at atmospheric pressure, at a rate of 79 ml./min over a course of 6.5 hours. After addition of water as in Example 2, followed by solvent distillation and recrystallization of residue, N-vinyl carbazole was obtained in amount corresponding to 96 percent of that theoretically expected from the initial amount of carbazole.

EXAMPLE 4

The procedure of Example 1 was followed to produce 0.17 moles of cesium carbazole from the theoretical amounts of carbazole and cesium hydroxide and 170 ml. of N,N-dimethylacetamide were added. After heating the mixture to 140°–145° C., acetylene was passed into the mixture at a flow rate of 79 ml./min over a period of 3 hours, totalling 0.373 moles. The mixture was maintained at atmospheric pressure throughout the reaction. After addition of water, separation from N,N-dimethylacetamide, and recrystallization, a yield of N-vinyl carbazole was obtained corresponding in amount to 76 percent of the theoretical expected weight.

EXAMPLE 5

The procedure of Example 4 was followed except that 0.244 moles of rubidium carbazole were prepared from the theoretical amounts of carbazole and rubidium hydroxide, the amount of N,N-dimethylacetamide was 200 ml. and 0.50 moles of acetylene were introduced at a rate of 39 ml./min over a period of 5 hours at 140° – 150° C. After hydrolysis and recrystallization, N-vinyl carbazole was obtained in amount corresponding to 76 percent of theoretical based on initial amount of carbazole.

EXAMPLE 6

Potassium carbazole prepared as in Example 1 was dispersed in dimethyl sulfoxide and the mixture was treated with acetylene and hydrolyzed using the procedure of Example 5. N-vinyl carbazole was obtained in good yield.

EXAMPLE 7

Methyl lithium (0.286 moles as a 5 percent solution in ethyl ether) was added dropwise to 0.286 moles of carbazole in 200 ml. of tetrahydrofuran. The tetrahydrofuran was distilled off while an equal volume of N-methyl-2-pyrrolidone was simultaneously and gradually added to replace it. The resulting mixture of 0.286 moles of lithium carbazole in 200 ml. of N-methyl-2-pyrrolidone was heated to 190°–210° C. Maintaining the mixture at atmospheric pressure throughout, 1.39 moles of acetylene were bubbled through a sintered glass filter tube and into the mixture over a period of 11 hours. The mixture was then cooled to room temperature and a quantity of water added to precipitate an oil. This oil was extracted into ether, washed with water to remove N-methyl-2-pyrrolidone and dried over calcium chloride. After separation of the calcium chloride by filtration, the oil was purified by distillation under reduced pressure. A recrystallized sample was identified as N-vinyl carbazole.

It will be understood that it is intended to cover all changes and modifications of the examples of the invention herein chosen for the purpose of illustration which do not constitute departures from the spirit and scope of the invention.

What is claimed is:

1. A method for preparing an intermediate hydrolyzable to N-vinyl carbazole which comprises passing acetylene into a substantially anhydrous liquid mixture of an alkali-metal carbazole in an inert reaction medium selected from the group consisting of N-methyl-2-pyrrolidone, N,N-dimethylacetamide and dimethyl sulfoxide, said mixture containing at least 10 percent by weight of said metal carbazole.

2. The method of claim 1 wherein the mixture is maintained at a pressure less than about 5 atmospheres.

3. The method of claim 2 wherein the pressure is substantially atmospheric.

4. The method of claim 2 wherein the mixture is maintained at a temperature of between about 140° C. and 210° C. while the acetylene is passed thereinto.

5. The method of claim 4 wherein the alkali-metal is selected from sodium, potassium, cesium or rubidium and wherein the temperature of the mixture is between about 140° and 180° C.

6. The method of claim 4 wherein the alkali-metal is lithium and the temperature is between about 190° C. and 210° C.

7. A method for preparing N-vinyl carbazole which comprises the steps of (a) passing acetylene into a substantially anhydrous mixture of between about 10 percent and 50 percent of an alkali-metal carbazole in correspondingly between about 90 percent and 50 percent of an inert reaction medium selected from the group consisting of N-methyl-2-pyrrolidone, N,N-dimethylacetamide and dimethyl sulfoxide to form an intermediate, said mixture being maintained at a pressure of about 0.5 to 5 atmospheres, and (b) hydrolyzing said intermediate.

8. The method of claim 7 wherein the hydrolyzing of step (b) is effected by adding water to the intermediate mixture in amount substantially stoichiometrically equivalent to the alkali-metal carbazole and wherein the N-vinyl carbazole is recovered by distilling off the reaction medium.

9. The method of claim 7 wherein the hydrolyzing step (b) is effected by adding an excess of water sufficient to precipitate the crude N-vinyl carbazole.

10. The method of claim 7 wherein the concentration of alkali-metal carbazole in the reaction medium is between about 20 percent and 35 percent, wherein the pressure on the reaction mixture is substantially atmospheric and wherein the temperature of the reaction mixture is maintained at between about 140° C. and 210° C.

11. The method of claim 7 wherein the alkali-metal carbazole is first prepared in situ in said medium by reaction therein of carbazole with a stoichiometrically equivalent amount of an alkali-metal hydride or alkali-metal alkyl.

12. A method for preparing N-vinyl carbazole which comprises the steps of
1. mixing equimolar quantities of potassium hydroxide and carbazole in substantially anhydrous xylene to form water and potassium carbazole in the xylene mixture, the relative quantitiy of xylene being such as to make the potassium carbazole content of the mixture equal to between about 20 percent and 30 percent,
2. removing the water by refluxing said mixture through a Dean-Stark trap,
3. distilling off the xylene and simultaneously adding an equal weight of N,N-dimethylacetamide, to form a substantially xylene-free and anhydrous reaction medium containing 20 to 30 percent potassium carbazole and 70 – 80 percent N,N-dimethylacetamide,
4. maintaining said reaction medium at a temperature of between about 145° C. and 160° C., and at a substantially atmospheric pressure while
5. bubbling acetylene into said reaction medium through a sintered glass nozzle to form an intermediate and
6. hydrolyzing said intermediate to form N-vinyl carbazole.

* * * * *